United States Patent [19]

Evans

[11] 4,265,116

[45] May 5, 1981

[54] FLUIDIC TEMPERATURE SENSOR

[75] Inventor: Paul S. Evans, Mesa, Ariz.

[73] Assignee: The Garrett Corporation, Los Angeles, Calif.

[21] Appl. No.: 80,902

[22] Filed: Oct. 1, 1979

[51] Int. Cl.³ ............................................. G01K 11/00
[52] U.S. Cl. ..................................... 73/357; 137/804; 137/820
[58] Field of Search ................... 73/357; 137/820, 804, 137/805, 835

[56] References Cited

U.S. PATENT DOCUMENTS

| 3,083,574 | 4/1963 | Messerly | 73/357 |
|---|---|---|---|
| 3,314,294 | 4/1967 | Colston | 73/357 |
| 3,566,689 | 3/1971 | Ringwall et al. | 137/804 |
| 3,570,514 | 3/1971 | Sutton et al. | 137/820 |
| 3,592,213 | 7/1971 | Smith | 137/98 |
| 3,616,809 | 11/1971 | Laakanemi et al. | 137/820 |
| 3,654,945 | 4/1972 | Soviche et al. | 137/820 |
| 3,665,947 | 5/1972 | Mayer | 137/820 |
| 3,707,440 | 12/1972 | Frederick | 137/820 |
| 4,196,626 | 4/1980 | Manion | 137/835 |

Primary Examiner—Donald O. Woodiel
Attorney, Agent, or Firm—Fay I. Konzem; J. Richard Konneker; Albert J. Miller

[57] ABSTRACT

A fluidic analog temperature sensor which compensates for variations in the supply pressure to the temperature sensor.

17 Claims, 1 Drawing Figure

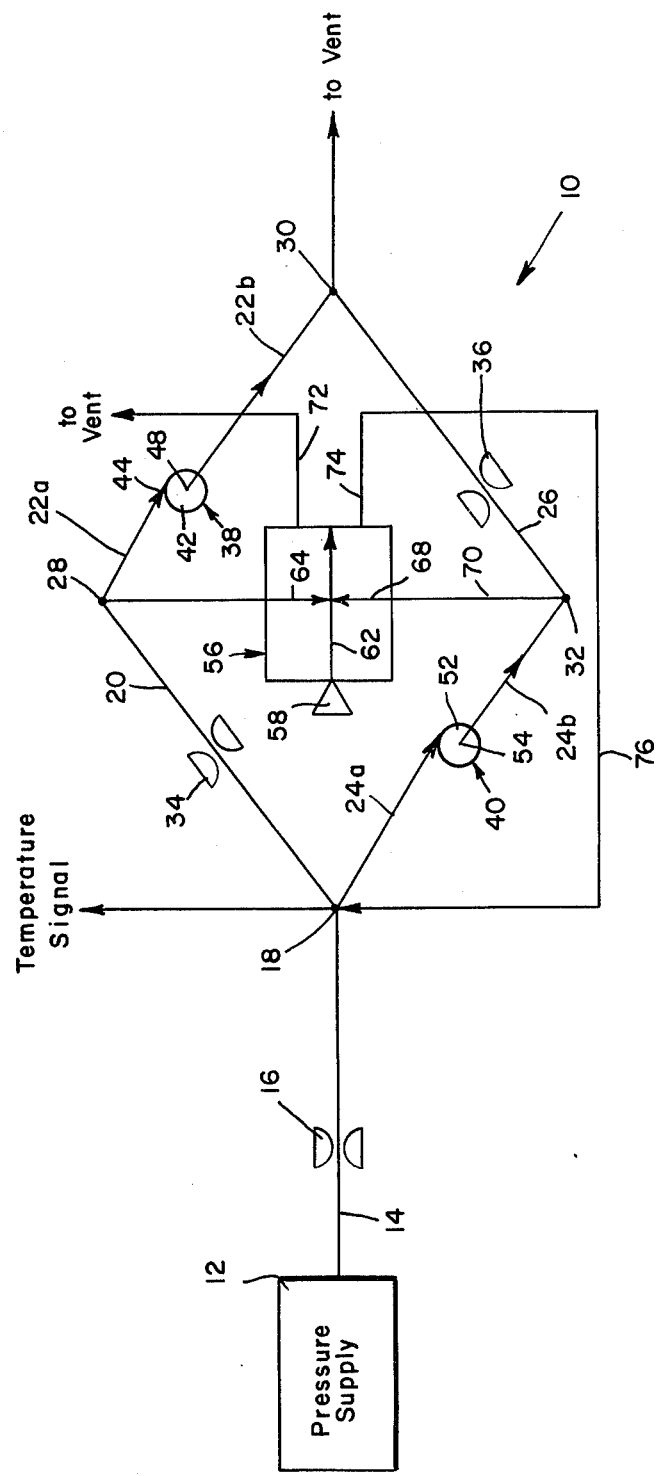

FLUIDIC TEMPERATURE SENSOR

BACKGROUND OF THE INVENTION

1. Field of the Invention

This invention relates to temperature sensors and more particularly to a fluidic temperature sensor.

2. Description of the Prior Art

In the art, fluidic temperature sensing systems have been developed. One such system consists of a plurality of fluidic temperature sensing capillary tube resistors connected in a sensing network having a modified Wheatstone bridge of fluidic resistance. Such a system is described in U.S. Pat. No. 3,616,809, entitled "Fluidic Condition Sensing Apparatus," by R. N. Laakaniemi et al. One problem with such fluidic temperature sensing systems is the difficulty in very accurately measuring temperature because of variations in the supply pressure to the fluidic temperature sensor.

SUMMARY OF THE INVENTION

The temperature sensor, in accordance with the invention, consists of a multiple branched network connected to a pressure supply and having a fluid resistance element for measuring temperature. The fluidic temperature sensor also includes a fluidic amplifier for sensing the variations in supply pressure and feeding back this signal to the input of the network thereby compensating for the supply pressure variations.

The present invention minimizes the supply pressure variations affecting the temperature measurements by providing a fluidic amplifier which senses the supply pressure variations and a feedback loop which compensates for these variations.

BRIEF DESCRIPTION OF THE DRAWINGS

The FIGURE is a schematic block diagram of the fluidic temperature sensor of the present invention.

DETAILED DESCRIPTION OF THE PREFERRED EMBODIMENT

Referring to the FIGURE, there is provided a pressure supply 12, which supplies a pressure to an input line 14 with a fixed restrictor 16 of the orifice type, which establishes a pressure drop, thereby establishing the supply pressure applied via the line 14 to a junction 18. The temperature sensor and pressure compensating fluidic circuit 10 of the present invention includes a bridge network having four branches or legs 20, 22, 24 and 26. The upper legs 20 and 22a interconnect at a junction 28; the legs 22b and 26 interconnect at a junction 30 which opens to a vent; the lower legs 24b and 26 interconnect at a junction 32; and the legs 20 and 24a interconnect at the junction 18.

The leg 20 of the bridge network includes a capillary tube resistor 34 and the leg 26 includes a capillary tube resistor 36. The resistance of the resistors 34 and 36 change as the temperature around the resistors 34 and 36 changes, respectively. The leg 22 includes a vortex resistor 38 and the leg 24 includes a vortex resistor 40. The resistance of the vortex resistors 38 and 40 is due to angular momentum of the fluid flowing through the legs 22 and 24, respectively. The vortex resistor 38 comprises a circular chamber 42 into which fluid is introduced tangentially at a point 44 from the leg 22a. An outlet port 48 leads from the center portion of the circular chamber 42 to the leg 22b. Fluid flowing from the leg 22a swirls around in the chamber 42 and exits through the outletport 48 to the leg 22b.

The vortex resistor 40 comprises a circular chamber 52 with an outlet port 54 and functions in a similar manner to that of the vortex resistor 38.

A fluidic proportional amplifier 56 is interconnected between the junctions 28 and 32. The fluidic amplifier 56 has an input passage 62 which communicates with a source 58 of fluid pressure. The amplifier 56 is also provided with a first control port 64 connected via a passage 66 to the junction 28 and a second control port 68 connected via a passage 70 to the junction 32. The fluidic amplifier 56 also includes a pair of outlet passages 72 and 74. The outlet passage 72 vents to the atmosphere and the outlet passage 74 feedsback via a line 76 to the junction 18.

In order for the temperature sensing apparatus of the present invention to very accurately measure temperature, the supply pressure to the apparatus must be constant, i.e., no variations in the supply pressure. In operation, when the pressure from the pressure supply 12 varies, the pressure across the capillary tube resistor 34 and the pressure across the vortex resistor 40 will change thereby causing a pressure drop between the junctions 28 and 32. The pressure drop between junctions 28 and 32 causes the control ports 64 and 68 of the fluidic amplifier 56 to deflect the main power stream from the supply port 58 so that a pressure signal is transmitted via the feedback line 76 to the junction 18. The feedback pressure will vary the pressure at the junction 18 until the pressure drop across the control ports of amplifier 56 is minimized, thereby minimizing the pressure variation to the bridge network at the junction 18.

Additionally, when the temperature environment of the bridge network changes, the resistance of the capillary tube and the vortex restrictors 34 and 40 resulting in a pressure drop across the control ports of amplifier 56 since the ratio of the resistance of the capillary tube resistor 34 to the resistance of the vortex resistor 40 is no longer the same. This pressure drop causes a pressure signal to be fed back via the feedback loop 76 to the junction 18 which stabilizes the pressure at junction 18 such that the pressure drop across the control ports of amplifier 56 is minimized. The signal at the junction 18 then reflects the change in resistance of the resistor 34 and is representative of the temperature. This temperature signal can then be used by external control systems.

Although the device which has just been described appears to afford the greatest advantages for implementing the invention, it will be understood that various modifications can be made thereto without going beyond the scope of the invention, it being possible to replace certain elements by other elements capable of fulfilling the same technical functions therein.

What is claimed is:

1. A fluidic temperature sensing system comprising:
 a supply of pressurized fluid;
 fluidic temperature sensing means having an input coupled to said supply of pressurized fluid;
 means for sensing pressure variations in said supply of pressurized fluid; said pressure variation sensing means being coupled to said fluidic temperature sensing means; and
 means for compensating for pressure variations in said supply of pressurized fluid, said compensating means being coupled between said input and said pressure variation sensing means.

2. The fluidic temperature sensing system of claim 1, wherein said fluidic temperature sensing means comprises a multiple branch network having at least one fluidic resistance element connected in each of the branches.

3. The fluidic temperature sensing system of claim 1, wherein said means for sensing pressure variations in said supply of pressurized fluid comprises a fluidic proportional amplifier.

4. The fluidic temperature sensing system of claim 1, wherein said fluidic temperature sensing means comprises:
   a multiple branch network including first and second branches;
   said first and second branches having a common input-output terminal coupled to said input; and
   a plurality of fluidic resistance elements;
   said fluidic resistance elements including at least one temperature sensitive fluidic resistance means connected in one of said first and second branches;
   said fluidic resistance elements including at least one fluidic vortex resistor connected in the other of said first and second branches;
   a third branch connected to said first branch at a first junction;
   a fourth branch connected to said second branch at a second junction;
   said third and fourth branches having a common terminal;
   said fluidic resistance elements including at least one fluidic vortex resistor connected in said third branch;
   said fluidic resistance elements including at least one temperature sensitive fluidic resistance means connected in said fourth branch.

5. The fluidic temperature sensing system of claim 1, wherein said fluidic temperature sensing means comprises:
   a Wheatstone bridge network having first, second, third and fourth branches;
   said first and second branches having a common input-output terminal coupled to said supply of pressurized fluid;
   said first branch coupled to said third branch at a first junction;
   said second branch coupled to said fourth branch at a second junction;
   said third and fourth branches having a common terminal;
   said first and fourth branches including at least one temperature sensitive fluidic resistance means;
   said second and third branches including at least one fluidic vortex resistor.

6. A fluidic temperature sensing system comprising:
   a pressurized fluid supply;
   a multiple branch network including first and second branches having a commmon input-output terminal coupled to said fluid supply;
   a plurality of fluidic resistance elements;
   said fluidic resistance elements including at least one temperature sensitive fluidic resistance means connected in one of said first and second branches;
   said fluidic resistance elements including at least one fluidic vortex resistor connected in the other of said first and second branches;
   a third branch connected to said first branch at a first junction;
   a fourth branch connected to said second branch at a second junction;
   said third and fourth branches having a common terminal;
   said fluidic resistance elements including at least one fluidic vortex resistor connected in said third branch;
   said fluidic resistance elements including at least one temperature sensitive fluidic resistance means connected in said fourth branch;
   a fluid amplifier coupled between said first and second junctions;
   said amplifier having feedback loop means coupled between the output of said amplifier and said input-output terminal of said first and second branches for maintaining the pressure at said input-output terminal for said first and second branches at a constant value related in a predetermined manner substantially solely to the temperature to which said multiple branch network is exposed, regardless of pressure fluctuations in said pressurized fluid supply.

7. A fluidic temperature sensor comprising:
   (a) fluidic temperature sensing means having input means for receiving pressurized fluid from a source thereof;
   (b) means associated with said temperature sensing means for sensing pressure variations in fluid received by said input means; and
   (c) means coupled between said input means and said pressure variation sensing means for compensating for pressure variations in fluid received by said input means.

8. A pressure-compensated fluidic temperature sensing apparatus comprising:
   (a) a multiple branch fluid flow network having input means for receiving pressurized fluid from a source thereof, and first and second branches coupled to said input means;
   (b) a capillary tube fluid resistor connected in said first branch;
   (c) a vortex fluid resistor connected in said second branch;
   (d) a fluidic amplifier connected between said first and second branches, said amplifier having a fluid outlet; and
   (e) fluid feedback means coupled between said amplifier outlet and said network input means for compensating for pressure variations in a pressurized fluid source connected to said input means of said fluid flow network.

9. A fluidic temperature sensor comprising:
   (a) fluidic temperature sensing means having input means for receiving pressurized fluid from a source subject to pressure fluctuations, said temperature sensing means including means for generating a pressure signal representative of a sensed temperature; and
   (b) means for utilizing said pressure signal to substantially eliminate temperature sensing inaccuracy caused by said pressure fluctuations.

10. The temperature sensor of claim 9 wherein said fluidic temperature sensing means include a fluid flow network having a pair of branches coupled to said input means, said pressure signal-generating means include a fluidic amplifier connected between said pair of branches, and said pressure signal utilizing means include a feedback loop coupled between said amplifier and said input means.

11. A pressure-compensated fluidic temperature sensor comprising:
(a) fluidic temperature sensing means including a multiple branch fluid flow network having an input adapted to receive pressurized supply fluid from a source thereof and having a pair of branches coupled to said input, each of said pair of branches having fluidic resistance means connected therein; and
(b) a fluidic amplifier having a pair of control ports each communicating with a different one of said pair of branches, and an outlet port commmunicating with said network input,
whereby, during operation of said temperature sensing means, the pressure at said input thereof is indicative of the temperature to which said network is exposed and is substantially unaffected by pressure fluctuations in the pressurized supply fluid source.

12. For use with a fluidic temperature sensor connected to a fluid supply source having an output pressure subject to undesired fluctuations, the method of compensating for said pressure fluctuations comprising the steps of:
(a) sensing pressure variations in the temperature sensor caused by said supply pressure fluctuations; and
(b) utilizing the sensed pressure variations to automatically adjust the pressure of supply fluid received by the temperature sensor.

13. The method of claim 12 wherein said sensing step (a) is performed by sensing a pressure differential across selected portions of the temperature sensor, and said utilizing step (b) is performed by impressing said pressure differential across a pair of control ports of a fluidic amplifier and connecting an outlet of the amplifier to the output of the fluid supply source.

14. The method of compensating for fluid supply pressure variations in a fluidic temperature sensor comprising the steps of:
(a) creating a pressure drop across selected portions of the temperature sensor in response to a variation in the fluid supply pressure; and
(b) using said pressure drop to stabilize the pressure of supply fluid received by the temperature sensor.

15. The method of claim 14 wherein the temperature sensor has a pair of fluid flow branches each coupled to an input receiving pressurized supply fluid, said step (a) is performed by connecting fluidic resistance means in each of said fluid flow branches, and said step (b) is performed by providing a fluidic amplifier having a pair of control ports and an outlet passage, connecting one of said control ports to one of said branches, connecting the other of said control ports to the other of said branches, and connecting said outlet passage of said amplifier means to said input of the temperature sensor.

16. The method of claim 15 wherein said step (a) includes the steps of connecting a capillary tube fluidic resistor in said one of said branches, and connecting a vortex fluidic resistor in said other of said branches.

17. The method of accurately sensing the temperature of a fluid comprising the steps of:
(a) providing a fluidic temperature sensor having an input connected to a source of pressurized fluid, and a fluid flow network coupled to said input;
(b) exposing said temperature sensor to a fluid whose temperature is to be measured;
(c) sensing a pressure change in said fluid flow network;
(d) adjusting the pressure at said input in response to said pressure change to render the input pressure indicative of the temperature of the fluid to which said temperature sensor is exposed and compensate for fluctuations in the fluid source pressure; and
(e) measuring the input pressure to determine the measured temperature.

* * * * *